United States Patent [19]

Dauvergne

[11] 4,313,795
[45] Feb. 2, 1982

[54] NUCLEAR POWER PLANT WITH ON-SITE STORAGE CAPABILITIES

[76] Inventor: Hector A. Dauvergne, P.O. Box 884, San Leandro, Calif. 94577

[21] Appl. No.: 129,029

[22] Filed: Mar. 10, 1980

[51] Int. Cl.³ .......................................... G21C 19/20
[52] U.S. Cl. .................................... 376/280; 176/65; 60/644.1; 376/402; 376/906
[58] Field of Search ...................... 176/37, 38, 60, 65, 176/87, 40, 27; 60/203, 643, 644

[56] References Cited

U.S. PATENT DOCUMENTS

| | | | |
|---|---|---|---|
| 3,668,070 | 6/1972 | Fiebelmann | 176/39 |
| 3,748,228 | 7/1973 | Zimmermann | 176/87 |
| 3,755,079 | 8/1973 | Weinstein | 176/27 |
| 3,935,063 | 1/1976 | Dunker | 176/38 |

*Primary Examiner*—Donald P. Walsh
*Attorney, Agent, or Firm*—Bielen and Peterson

[57] ABSTRACT

A nuclear power plant constructed with a nuclear reactor core centrally mounted within an elongated, split chamber pressure vessel having contained solid state heat transfer conductors for transfer of heat from a liquid core coolant to a gas power medium in an upper heat exchange chamber of the pressure vessel, and having a discharge mechanism for dumping the reactor core when spent into a lower radioactive material storage chamber of the pressure vessel, the power plant including a power generating system having a steam turbine, an electrical generator and a gas compressor.

11 Claims, 3 Drawing Figures

NUCLEAR POWER PLANT WITH ON-SITE STORAGE CAPABILITIES

BACKGROUND OF THE INVENTION

This invention relates to a nuclear power plant that is designed with a component design and arrangement with safety as a primary criteria. In particular, the power plant is designed for on-site disposal and storage of nuclear wastes and incorporates a component power generating system that utilizes a solid state heat transfer means that is both safe and compact.

In conventional nuclear power plants the reactor is utilized in conjunction with relatively standard steam generating systems for the production of electricity. However, the necessary heat exchangers required to insure isolation from contamination of the operating water for steam production are expensive, and subject to failure because of their size and high pressure for containment at high temperature. Furthermore, large cooling towers are required for condensing steam for recycling in the power loop. These requirements virtually dictate the large capital investment in stationary plants with all the attendant problems of on-site use and off-site disposal of nuclear wastes from spent fuels. Further, dismantling and disposal of such large plants is predicted to cost more than the initial cost of construction.

It is a primary object of the devised nuclear power plant to provide a power generating plant that uses nuclear fuels in a safe manner by providing for the necessary heat transfer within the primary reactor containment vessel by means that prevents the possibility of radioactive contamination of the power generating driving medium and by providing for on-site disposal and storage of the spent fuels. Further, the preferred power generating system eliminates the necessity of conventional heat exchanger boilers and condenser apparatus with their attendant high capital costs.

Because of the general undesirability of fission power as compared with the yet uncommercialized fusion power it is expected that nuclear power plants employing fission will ultimately be replaced by fusion plants and therefore such plants do not warrant the high attendant capital costs.

By limiting the components which are subject to radioactive contamination and by designing a plant that is contemplated to be disassembled, overall costs and radiation dangers can be minimized.

SUMMARY OF THE INVENTION

The nuclear power plant of this invention is constructed with an elongated vertically oriented, high pressure containment vessel within which a nuclear reactor core is centrally located. The power plant design is particularly adapted for use with a bare core or fast breeder reactor contained in a molten sodium medium which comprises an extractor medium for extracting heat generated in the reactor core. The pressure vessel is formed with two chambers at each end: a lower disposal and storage chamber for containment of dumped cores of spent fuel and an upper heat transfer chamber for transfer of the heat generated by the nuclear reactor to the driving medium for the power generation.

Within a central segment of the pressure vessel above the core is an array of solid state heat transfer conductors which comprise elongated thermally conductive rods. The rods are preferably fabricated from aluminum core in a seamless iron tube casing, or other material depending in part on the temperature operating range of the reactor unit. The lower portions of the vertically oriented rods are immersed in the molten sodium or similar medium surrounding the reactor core. A seal and support gasket seals the central segment of the pressure vessel containing the molten heat extractor medium and supports the plurality of rods in a spaced array for efficient heat transfer.

The upper portion of the pressure vessel comprises an isolated chamber free from contamination by the core reaction or extractor medium, which becomes radioactive on operation of the reactor. The conductive rods project into and largely fill the upper chamber to maximize the surface area for further transfer of the reactor generated heat to the power plant driving medium.

The power plant preferably utilizes a superheated steam as the driving medium in a closed cycle without condensation to water. In this manner, purified steam is cycled through the upper chamber under pressure where it picks up substantial heat from the conductive rods for expansion through a multi-stage steam turbine it produces rotary power for driving a connected electrical generator. The expanded steam at the reduced temperature from the energy transformation is then partially condensed to a point where most or some of the latent heat is removed then compressed by a conventional gas compressor for cycle return to the upper chamber of the pressure vessel.

For reasons of safety, only the top segment of the reactor pressure vessel and the power generating components are above ground. In this manner, any failure in these components will release only uncontaminated superheated steam to the atmosphere. Because of the relatively low operating pressures, the chance of failure is substantially reduced, also, low grade heat is put to use.

The reactor and molten heat extractor medium surrounding the core are below ground to isolate any contamination on any possible failure. Since there are no high pressure boiler components in contact with the heat extractor medium, the possibility of failure is substantially reduced.

Below the reactor is a lower pressure vessel chamber which forms a disposal dump for used cores. When the fuel is spent, a dump mechanism isolates the core and the immediately surrounding heat extractor medium and drops the material into the dump where it is retained for temporary storage. Depending on the contemplated length of temporary storage, alternate designs for the storage dump can be employed. The dump may include nuclear reaction inhibiting material, for example, material with neutron absorbing characteristics to reduce the possibility of radioactive emissions and to control a reacting core inadvertently introduced into the dump by a meltdown.

The dump is designed to accomodate multiple expended cores for continued on-site storage. When filled, the lower portion of the pressure vessel defining the disposal dump can be sealed. The remaining portion of the pressure vessel can be deactivated or moved to an adjacent or new site along with the attendant power generating components. The conventional power generating components are easily detached and reused as they are without contamination.

These and other features of the invention will become apparent from the detailed description of the preferred embodiment. Because of the compact size of the power plant it is suitable for use in marine applications by simple substitution of the electrical generator with mechanical propulsion means. In such application the core storage component can be reduced in size or eliminated. In such applications vertical orientation of the containment vessel may not be preferred.

For a better understanding of the invention, reference is made to the following description.

DETAILED DESCRIPTION OF THE PREFERRED EMBODIMENTS

Figures 1, 3:
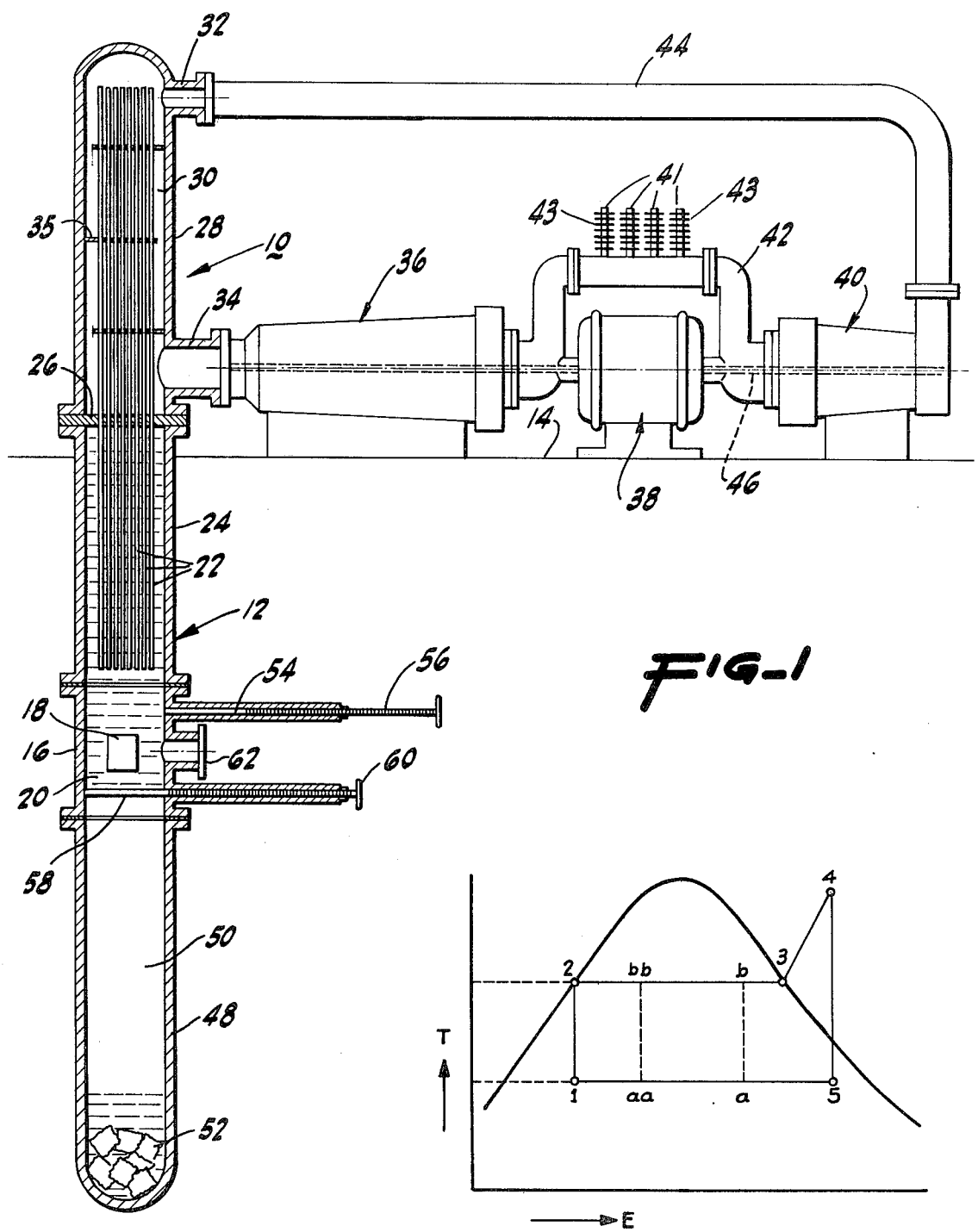
FIG. 1 is a schematic illustration of the nuclear power plant of this invention.
FIG. 3 is a schematic of an operating cycle.

Referring to FIG. 1, a schematic arrangement of the nuclear power plant of this invention designated generally by the reference numeral 10 is shown. The power plant is constructed with a large, elongated, high-pressure containment vessel 12 which is vertically oriented, with a substantial portion of the vessel located below ground level 14. The pressure vessel is segmented for ease of fabrication and for component assembly and disassembly when broken down for site transfer or retirement.

Within a lower central segment 16 of the pressure vessel is located a reactor core 18 of the fast breeder, sodium cooled type. The reactor core is immersed in a molten sodium heat extractor medium 20 as in a conventional sodium reactor. The molten sodium extracts the heat of the thermal nuclear reaction and by conduction, transfers the heat throughout the extractor medium. However, instead of cycling the molten sodium to a conventional heat exchanger for production of steam, the molten sodium is simply confined by the pressure vessel and employed as a thermal bath into which is immersed a plurality of thermal conductor rods 22.

The thermal conductor rods 22 are arranged in a geometric bundle, each rod spaced from its neighbor to maximize the effective surface area of the rod bundle. Therefore, in interfacing the substantial quantity of liquid sodium in an upper central segment 24 of the pressure vessel, the heat transfer is maximized. The elongated conductor rods 22 extend the length of the upper central segment 24 of the pressure vessel and pass through a seal and support gasket 26, which hermetically isolates an upper segment 28 of the pressure vessel from the upper central segment 24. The gasket 26 concurrently supports the conductor rods 22 in mutual displacement for the heat transfer optimization as noted above. The rods may be solid steel or iron rod stock or steel or iron tube encasing a more conductive aluminum core.

The conductor rods extend through the gasket 26 into a chamber 30 defined by the upper segment 28 of the pressure vessel. The chamber 30 has an inlet fitting 32 and an enlarged outlet fitting 34 for cycling a gas, preferably superheated steam, through the chamber. During cycling through the chamber 30 on the path defined by the baffles 35, the gas encircles the conductor rods 22 and absorbs the heat transferred by the rods from the sodium bath. The added thermal energy substantially increases the heat content of the steam which is used to drive a multi-stage steam turbine 36 preferably designed for equal stage nozzle velocity and low pressure drive. A steam turbine utilizing the concepts disclosed in U.S. Pat. No. 4,178,125, issued Dec. 11, 1979, entitled Bucket-Less Turbine Wheel by Hector A. Dauvergne, can be economically designed for the contemplated low pressure and low temperature drive conditions which are encountered in the steam cycle of the present invention. The steam turbine is connected to the outlet fitting 32 of the upper segment 28 of the pressure vessel. The steam turbine drives a conventional on line electrical generator 38, and an on line gas compressor 40. A custom compressor can be designed, specially adapted for this cycle. However, since the steam is retained as a gas in the entire cycle a conventional gas compressor can be used with satisfactory results. The compressor compresses the expanded steam, from which a substantial portion of the thermal energy has been lost to power generation in the turbine, and partial condensation to a volume that is convenient to recycle to the pressure vessel chamber. To achieve the thermal economic advantages, a plurality of conventional heat pipes 41 or suitable condensors are incorporated adjacent the compressor inlet. The heat pipes 41 act as conditioners to isothermically reduce the latent heat for the gas compressor operation and transfer the heat by air fins 43 or to some other low temperature device for use.

For optimum safety the power generation cycle can operate at relatively low temperatures and pressures. For example, with a molten sodium extractor medium at 1000° F., the rods would heat to approximately 800° F. in the chamber end of the pressure vessel. With steam pressure in the chamber at 166 psia, the superheated steam would drop to a temperature of approximately 287° F. and pressure of 55 psia in the tubine exhaust. After heat is transferred by the heat pipes 41, and work is expended on the wet steam by the gas compressor, the wet steam would rise to a temperature of about 366° F. and pressure of 167 psia in delivery pipe line 44 before entry into the heat chamber 30 of the pressure vessel for superheating to 800° F.

This cycle is shown in temperature-entropy graph of FIG. 3. The curve defines the wet steam zone under the curve. To the left the wet steam becomes saturated and to the right the steam becomes superheated. At point 1, the wet steam is still displaced from the saturation point at 0. It can therefore be compressed to point 2, causing a temperature increase and reach its limit before saturation. Heat is added to the saturated steam by the rods source and it will remain at constant temperature from point 2 to 3 where further heat addition will cause the steam to become superheated or dry steam rising in temperature to approach the temperature of the external heat source, point 4. Between point 4 and point 5 the steam is available for work where it falls in temperature and pressure until no further work can be practically removed. Before compressing, further heat is removed to relieve the burden on the compressor. The exemplar cycle would operate in the following parameters:

| Point | Temperature | Pressure |
| --- | --- | --- |
| 1 | 287 | 55 |
| 2 | 366 | 166 |
| 3 | 366 | 166 |
| 4 | 800 | 166 |

-continued

| Point | Temperature | Pressure |
| --- | --- | --- |
| 5 | 287 | 55 |

While the cycle of FIG. 3 defined by the numerals is provided as a primary exemplar, it is to be understood that variations therein are possible. Instead of removing a substantial portion of the heat from the work expended steam at point 5 to point 1, where compression to point 2 will still fall short of liquifying the steam, heat can be removed to alternate points (a) or (aa), for example. On compression, the added heat will not cause the steam to become superheated as the desired pressure is achieved, the steam rising to points (b) or (bb). This is still within the curve defining the points at which the steam becomes superheated.

While the heat transfer means by the solid state conductor rods could be employed to boil water for a conventional steam generator-condensor cycle by introducing water to the heat chamber 30, the superheated steam cycle is preferred where safety is a primary consideration. By a simple common rotor/drive shaft 46 the three components of the power generating system, the turbine 36, the generator 38 and the compressor 40 can be most efficiently arranged.

The disposal and storage features of the subject nuclear power plant are based on the premise that transportation of nuclear wastes is to be minimized and preferably avoided. It is proposed that the nuclear power plant be in the first instance located where it is desirable to temporarily store the nuclear wastes. By temporary storage, it is intended that such storage be for the period necessary to resolve the problem of permanent storage or deactivation of the radioactivity. It is also proposed that the plant itself be designed with an integral storage facility such that the nuclear waste is not removed from the reactor plant, further reducing transportation dangers.

In the nuclear plant devised, the pressure vessel 16 has a lower segment 48 defining a chamber 50 which comprises a dump for multiple expended reactor cores 52.

When the operating core 18 in the lower central segment 53 of the pressure vessel becomes reduced to the point it is no longer efficient, an upper slide valve 54 located immediately above the core 48 is extended by a screw mechanism 56 into the pressure vessel 16 to isolate the core and the immediately surrounding sodium medium. A lower slide valve 58 is then withdrawn by a similar screw mechanism 60 allowing the expended core and surrounding sodium medium to drop into the dump. The lower slide valve 58 is then replaced and a new core installed through control rod and access portion 62. The sodium is replenished and upper slide valve 54 withdrawn for resumed operation. The core 48 is shown only schematically and it is to be understood that it is to be of conventional design and mounted and installed in the pressure vessel in a conventional manner. For convenience of operation, control rods may adventageously be horizontally oriented for manipulation through the access port.

The dump may contain a control medium for inhibiting further nuclear reaction and if desired may contain adequate control means to curtail a chain reaction in a core introduced into the dump by meltdown.

Figure 2:
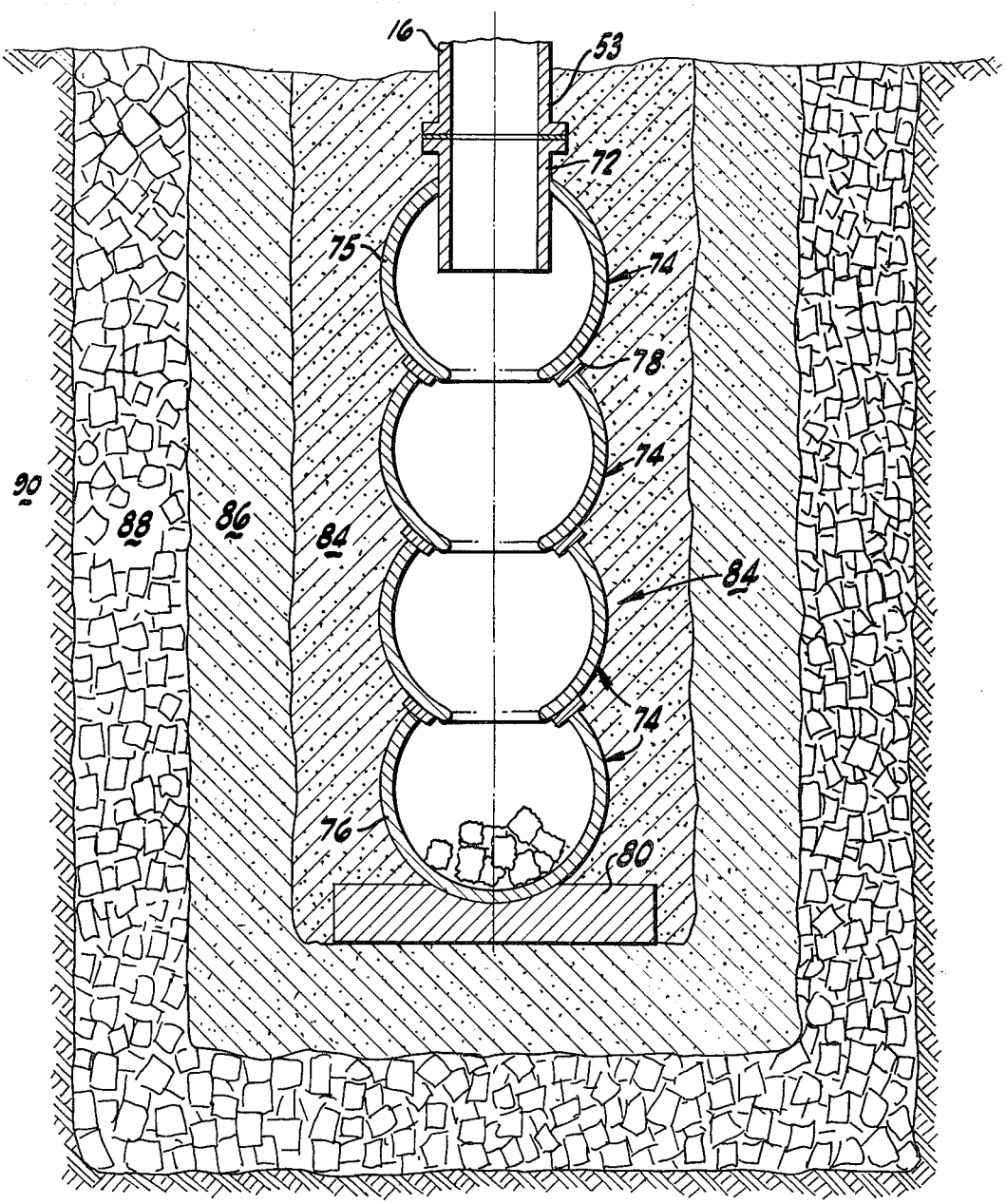
FIG. 2 is an alternate embodiment of the storage segment of the power plant of FIG. 1.

An alternate structure to the storage chamber 50 of FIG. 1 can be incorporated with the power plant arrangement for longer term storage than is recommended with the pressure vessel segment 48. The storage structure 70 of FIG. 2 is designed for storage of wastes for a period of at least fifty years. Because of natural shifts in the earth, it is desirable to avoid elongated storage cannisters which may be subject to shear type forces that can cause a rupture of the cannister. Ideally, the container should be spherical such that shear forces are avoided and acting earth forces become compressive in nature.

In FIG. 2, the lower central segment 53 of the pressure vessel 16, shown segmented, is connected to a sleeve 72, which is inserted into the uppermost of a series of spherically shaped container vessels 74. The upper container vessels 74 comprise conduits 75 and have an opening at the top and bottom through which wastes can pass to the bottom container vessel which comprises a spherical storage container 76. Each of the upper conduits 75 is seated on an integral flange 78 on the conduit 75 or container 76 below. The seating being spherical in contour and which may be precision ground is such that a seal is maintained even though adjacent vessels have shifted slightly. The conduits and storage container are preferably fabricated from concrete ceramic or glass to prevent deterioration. Below the container 76 is a support base 80 for supporting the column 82 formed in the container vessels 74. Surrounding the column 82 is a packing 84 of salt which prevents the introduction of moisture to the vicinity of the stored wastes. The salt packing also provides a lateral support to the column of floating container vessels. For stability, the salt packing 84 is encompassed by a peripheral layer of sand 86 and an outer layer of stone 88 before interfacing the local terrain 90.

In this manner, the column can withstand relatively large shocks in the surrounding terrain and maintain its integrity.

While there are additional controls and components necessary for on-site operation, these controls and components are known to those skilled in the art. The above disclosure is intended to present to those skilled in the art a system combining substantially conventional components into a novel arrangement for safe operation.

While in the foregoing specification embodiments of the present invention have been shown in considerable detail for the purposes of making a complete disclosure of the invention, it will be apparent to those of ordinary skill in the art that numerous changes may be made in such details without departing from the spirit and principles of the invention.

What is claimed is:
1. A nuclear power plant comprising:
 a. a containment vessel having:
  a first portion containing a nuclear reactor core and a molten core-coolant, heat transfer medium, said reactor core and heat transfer medium being radioactively contaminating,
  a second portion containing a power generating drive medium
  means for separating said first portion of said containment vessel from said second portion,
  wherein said second portion is isolated from radioactive contamination from said reactor core and said heat transfer medium in said first portion; and
  solid state, heat transfer conductors having a first conductor portion in contact with said heat transfer medium of said first portion of said containment vessel and a second conductor portion in contact with said drive medium in said second portion of said containment vessel, wherein said heat transfer conductors remain in a solid state during transfer of heat by thermal conduction from said first portion of said containment vessel to said second portion of said containment vessel; and b. power generating means connected to said containment vessel for generating electric power by use of said drive medium.

2. The nuclear power plant of claim 1 wherein said solid state heat transfer conductors comprise a plurality of elongated thermally conductive rods arranged in an array wherein said rods are spaced from one another.

3. The nuclear power plant of claim 1 wherein said plant comprises further a reactor core storage dump connected to and directly below said containment vessel for storage of spent nuclear reactor cores, said containment vessel having means for dropping a spent reactor core together with a portion of molten core-coolant heat transfer medium into said dump from said first portion of said containment vessel.

4. The nuclear power plant of claim 3 wherein said reactor core storage dump comprises an elongated third portion of said containment vessel oriented below said first portion of said containment vessel and separable therefrom, said third portion having a capacity to contain and store a plurality of spent reactor cores and a quantity of core-coolant, heat transfer medium.

5. The nuclear power plant of claim 3 wherein said reactor core storage dump comprises an elongated column of container vessels, said container vessels being substantially spherical in configuration and vertically oriented wherein said container vessels comprise a bottom vessel and upper vessels arranged in a series and supported on said bottom vessels, said upper vessels having top and bottom openings, and said bottom vessel having a top opening wherein wastes deposited in said upper vessels pass to said bottom vessel for storage.

6. The nuclear power plant of claim 5 wherein said column of container vessels is located in a salt pack means for maintaining the stability of the column.

7. The nuclear power plant of claim 1 wherein said power generating drive medium comprises a heated gas, for use with other low grade fuels in conventional boilers.

8. The nuclear power plant of claim 7 wherein said power generating means comprises a turbine having means connected to said second portion of said containment vessel for receiving heated pressurized gas from said containment vessel, an electric generator mechanically connected to said gas turbine, and a gas compressor mechanically connected to said gas turbine having means connected to said gas turbine and said second portion of said containment vessel for receiving gas discharged from said gas turbine, and returning such gas after compression by said compressor to said second portion of said containment vessel.

9. The nuclear power plant of claim 8 wherein said gas compressor includes a gas conditioner means for reducing the heat content of gas received by the compressor.

10. The nuclear power plant of claim 8 wherein said heated gas comprises a superheated steam.

11. A method for producing useable power with steam comprising the cycle steps of:

a. compressing wet steam at a first temperature and pressure to a second temperature and pressure less than the saturation point of the wet steam;

b. adding heat from an external source comprising solid state heat transfer conductors having a first portion in contact with a heat transfer medium of a nuclear reactor core and a second portion in contact with the steam, said heat transfer conductor remaining in a solid state condition during operation of the cycle to the wet steam wherein the steam maintains a substantially constant second temperature and pressure to the superheated point wherein the steam is dry;

c. adding additional heat from said external source to the dry steam, superheating the dry steam wherein the temperature of the steam at the second pressure is raised to a third temperature;

d. extracting work from the steam at the second pressure, and third temperature reducing the steam to approximately the first temperature and pressure;

e. extracting heat from the steam at the first temperature and pressure for return of the steam to the conditions of the first step.

* * * * *